United States Patent [19]

Owens, Jr.

[11] 4,442,610

[45] Apr. 17, 1984

[54] MAGNETIC PLUMB BOB HOLDER

[76] Inventor: George H. Owens, Jr., 2215 Windsor Ave., Montgomery, Ala. 36107

[21] Appl. No.: 479,863

[22] Filed: Mar. 24, 1983

[51] Int. Cl.$^3$ ............................................. G01C 15/10
[52] U.S. Cl. ...................................... 33/392; 33/413; 33/DIG. 1
[58] Field of Search ................. 33/391, 392, 393, 347, 33/339, 413, 369, 353, DIG. 1, 191, 189

[56] References Cited

U.S. PATENT DOCUMENTS

| | | | |
|---|---|---|---|
| 2,545,321 | 3/1951 | Tumminello | 33/393 X |
| 2,794,263 | 6/1957 | Cranmer | 33/392 X |
| 3,068,573 | 12/1962 | Sidwell | 33/392 X |

Primary Examiner—Harry N. Haroian
Attorney, Agent, or Firm—Harvey B. Jacobson

[57] ABSTRACT

A support body is provided having first and second opposite sides with one of the opposite sides including surface structure facing outwardly of the one side and lying in a predetermined reference plane. The other of the opposite sides of the body includes a central outward projection including line anchoring structure for anchoring one end portion of a plumb line thereto in a manner such that the other end portion of the plumb line may extend outwardly and away from the body other side along a straight path disposed normal to the reference plane. The one side of the body defines an outwardly opening recess and the body includes projection structure projecting outwardly of an inner portion of the recess and including a pointed outer extremity terminating outwardly at least closely adjacent the reference plane and centered relative to the aforementioned path. The body further includes window structure defining an opening therethrough opening outwardly of the other body side spaced from said projection and into the recess for viewing the outer extremity of the projection structure from outwardly of the body other side. Also, the one side of the body includes structure defining an outwardly opening groove extending thereacross with a central portion of the defined groove aligned with the aforementioned path and the pointed outer extremity of the projection structure.

7 Claims, 8 Drawing Figures

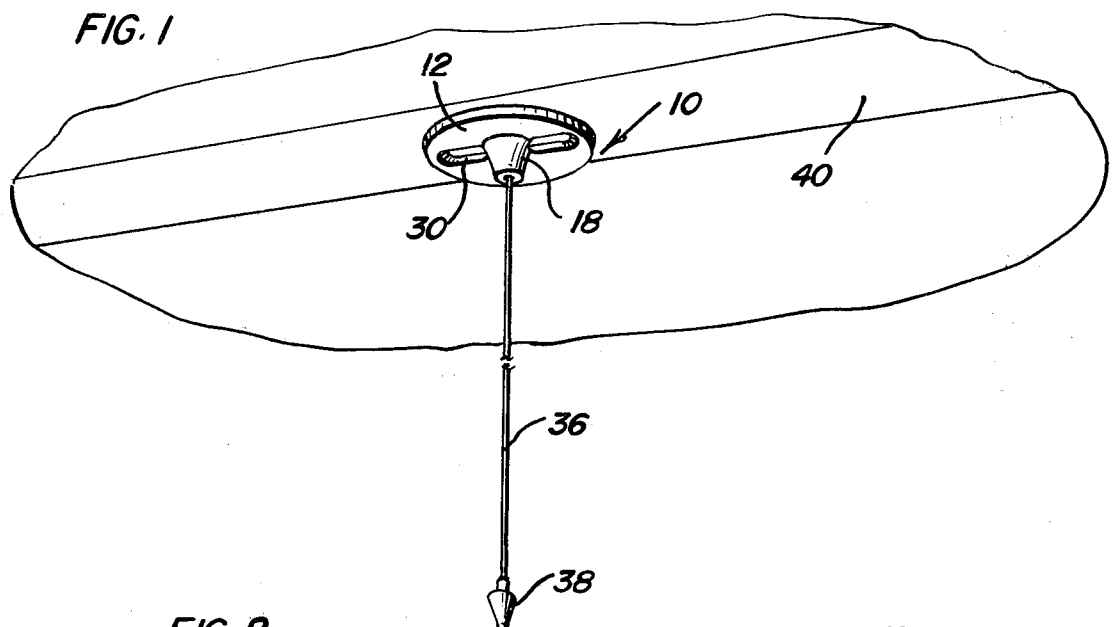
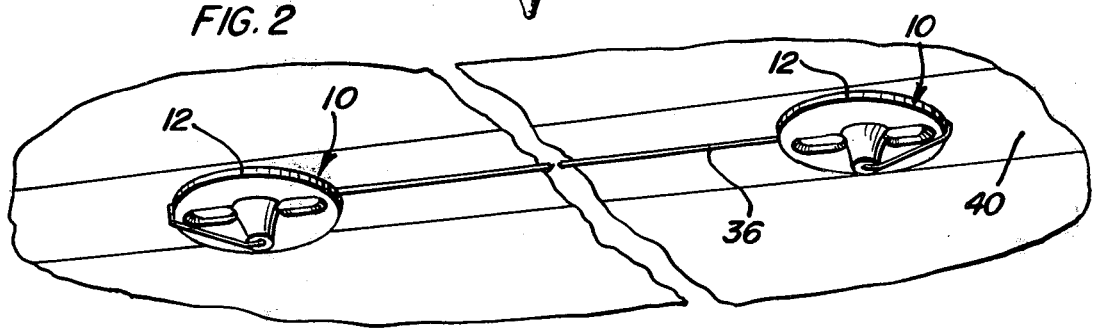
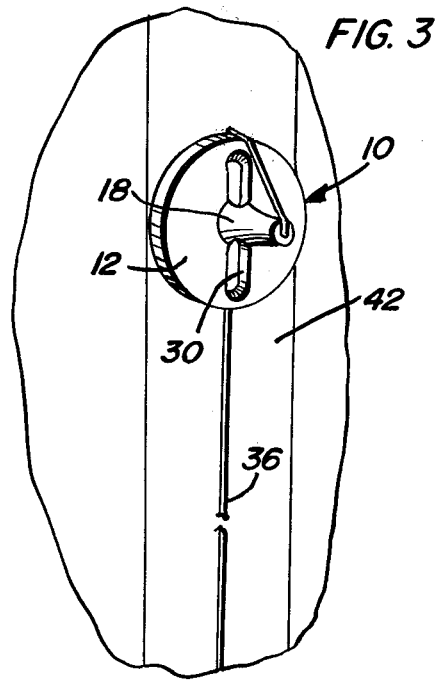
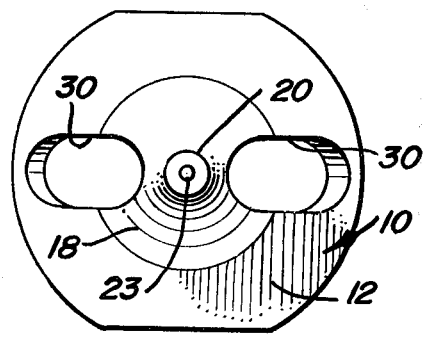

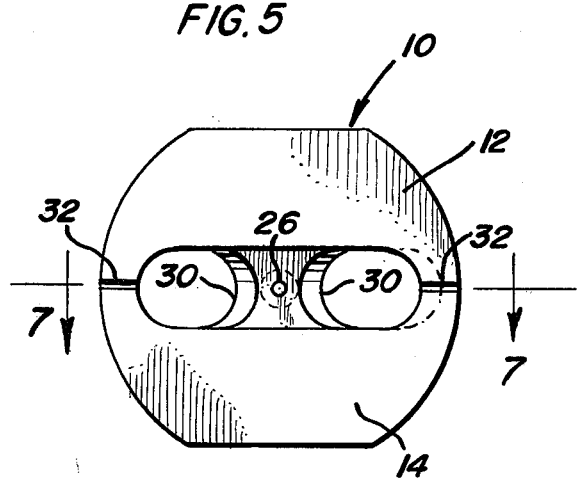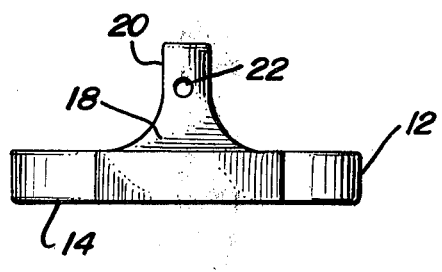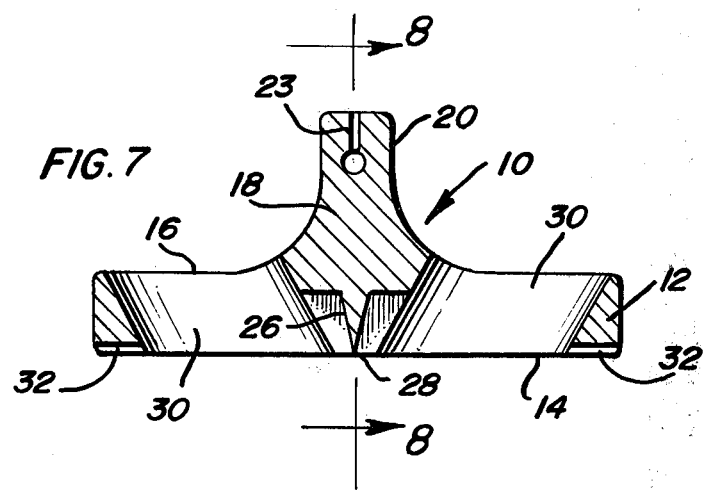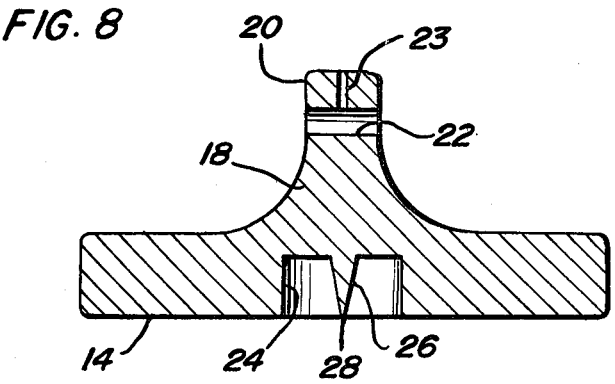

MAGNETIC PLUMB BOB HOLDER

BACKGROUND OF THE INVENTION

In many instances it is necessary to establish a plumb line from an elevated point to a lower point and wherein there is no convenient structure from which to support an upper anchor for the plumb line. Accordingly, a need exists for a plumb line support which may be conveniently supported from substantially any ferrous structure.

In addition, it is often desirable to support a plumb line in exact position relative to a precise location on a support structure and many previously known forms of plumb line supports do not include structure whereby such precise positioning of a plumb line may be accomplished. Accordingly, there is a further need for a plumb line support which may be precisely positioned relative to a predetermined point on a support structure.

Examples of plumb line supports including some of the general structural and operational features of the instant invention are disclosed in U.S. Pat. Nos. 2,794,263, 3,068,573, 3,715,808 and 3,766,659.

BRIEF DESCRIPTION OF THE INVENTION

The plumb line holder of the instant invention comprises a disc shaped body having one planar side adapted to abut a plane or other shaped support surface. The body is magnetic whereby it may be magnetically supported from a ferrous support structure and the other side of the body includes a central outward projection including structure for supporting one end portion of a plumb line therefrom in a manner such that the other end of the plumb line may extend outwardly from the body in a direction normal to the planar side. The one planar side of the body includes a central recess equipped with projection structure projecting outwardly of an inner portion of the recess and including a pointed outer extremity terminating outwardly at least closely adjacent the plane of the planar side and the body additionally includes a window therethrough opening into the recess at one end and outwardly through the other side of the body at the other end with the window enabling viewing of the outer extremity of the projection structure from the other side of the body. In addition, the planar side of the body includes structure defining a shallow straight groove extending thereacross with a longitudinally central portion of which the pointed outer extremity of the projection structure is registered.

The plumb line support is constructed of magnetic material whereby it may be magnetically supported from any ferrous object and, in addition, the projection extending outwardly from the side of the body remote from the planar side thereof is of a configuration to define a hand grip whereby the support may be hand supported in stationary position relative to a non-ferrous support structure.

The main object of this invention is to provide a support structure from which a plumb line may be conveniently supported.

Another object of this invention is to provide a plumb line support including magnetic means whereby the support may be magnetically supported from a ferrous support structure.

Still another important object of this invention is to provide a plumb line support including structure enabling the support to be mounted upon a supporting structure in precise predetermined position thereon.

A further important object of this invention is to provide a plumb line support which is adapted to support a plumb line from the underside of a horizontal support structure or from one side vertical face of a suitable support structure.

A final object of this invention to be specifically enumerated herein is to provide a plumb line support in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the plumb line support in operative association with a supported plumb line and a support structure from which the support is magnetically supported;

FIG. 2 is a perspective view similar to FIG. 2 but illustrating the manner in which the plumb line support may be utilized to establish a straight reference line between two support structure portions from which a pair of supports constructed in accordance with the present invention are supported;

FIG. 3 is a fragmentary perspective view illustrating the manner in which the plumb line support may support a plumb line from a vertical support member;

FIG. 4 is an enlarged plan view of the support;

FIG. 5 is a plan view of the support illustrating the side thereof opposite the side illustrated in FIG. 4;

FIG. 6 is a side elevational view of the support;

FIG. 7 is an enlarged fragmentary sectional view taken substantially upon the plane indicated by the section line 7—7 of FIG. 5;

FIG. 8 is a sectional view taken substantially upon the plane indicated by the section line 8—8 of FIG. 7.

DETAILED DESCRIPTION OF THE INVENTION

Referring now more specifically to the drawings, the numeral 10 generally designates the support of the instant invention. The support 10 comprises a disc shaped body 12 including one planar axial end face or side 14. The axial end face or side 16 remote from the planar side or end face 14 includes a central outward projection 18 having a generally cylindrical outer end portion 20 including a large diameter diametric bore 22 formed therethrough. The outer end portion 20 also includes a central axial bore 23 of smaller diameter. The inner end of the smaller axial bore opens into the diametric bore 22.

The planar side or end face 14 has a central recess 24 formed therein and the body includes projection structure 26 within the recess 24 projecting outwardly of the inner end of the recess 24 and including a pointed outer extremity 28 which lies in or terminates at a point spaced slightly from the plane of the surface 14.

The body 12 additionally includes a pair of inclined windows 30 extending therethrough with one end of each window 30 opening through the side 16 adjacent the projection 18 and the other end of each window 30 opening through the side or end 14 and into the recess 24. In this manner, the exact positioning of the pointed extremity 28 on a surface against which the end face or surface 14 is abutted may be viewed through either of the windows 30 from outward of the side 16 of the body 12.

With attention now invited more specifically to FIG. 7, it may be seen that the end face or side 14 of the body 12 includes shallow grooves 32 formed therein and that the grooves 32 together define a groove extending across the face or side 14 with the outer extremity 28 registered with the midportion of the groove. Further, it will be noted that the body 12 is constructed of magnetic material whereby it may be magnetically supported from a ferrous support member. Otherwise, the body 12 may be constructed of a nonmagnetic material and have permanent magnets affixed thereto at points spaced thereabout whereby the body 12 may be magnetically supported with a ferrous support structure against which the side or face 14 is abutted.

In operation, the body 12 has the end of a plumb line 36 remote from the plumb bob 38 passed inwardly through the axial bore 23 and into the bore 22. The line end may be secured within the bore 22 against withdrawal 23 merely by forming a small knot (not shown) in the line 36 with the knot positioned in the bore 22 at the inner end of the bore 23.

Then, the support 10 may be supported from a metallic beam such as the beam 40 illustrated in FIG. 1 with the plumb line 36 extending vertically downwardly from the support 10. In addition, the support 10 may be supported from the beam 40 with the outer extremity 28 of the projection structure 26 precisely registered with a predetermined mark (not shown) on the beam 40. In addition, the bob 38 may be removed from the end of the line 36 and that end of the line 36 may be secured to a second support with the two supports then supported from the beam 40 in the manner illustrated in FIG. 2 with the line 36 having its opposite end portions received in the grooves 32 of each of the bodies 12. In this manner, a straight reference line may be defined by that portion of the line 36 extending between the bodies 12 and with each end of that reference line precisely positioned relative to a predetermined mark (not shown) on the beam 40 with which the associated projection structures 26 have their outer extremity 28 registered.

FIG. 3 of the drawings illustrates the manner in which the support 10 may be magnetically supported from a vertical beam 42 and the line 36 may be used as a plumb line from a predetermined point on the beam 42 with which the outer extremity 28 is registered. It is to be noted that the outer extremity and the adjacent area of any support structure against which the surface or face 14 is abutted may be viewed from the side 16 via the windows 30.

If the support structure against which the body 12 is to be abutted is not constructed of ferrous material, the projection 18 may be used as a handle in manually supporting the body 12 relative to that nonferrous support.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A plumb line support body having first and second opposite sides, one of said opposite sides including reference plane defining abutment surface means facing outwardly of said one side and lying in a predetermined reference plane, the other of said opposite sides including a central outward projection including line anchoring means for anchoring one end portion of a plumb line thereto in a manner such that the other end portion of the plumb line may extend outwardly and away from said other side along a straight path disposed generally normal to the reference plane, said one side of said body defining an outwardly opening recess therein, said body including projection means projecting outwardly by an inner portion of said recess and including a pointed outer extremity terminating outwardly at least partially adjacent said reference plane and centered relative to said path, said body including window means therein opening through the other side of said body and into said recess for viewing said outer extremity from outwardly of said other side.

2. The plumb line support body of claim 1 wherein said line anchoring means includes a transverse bore formed through said projection and a second bore formed in the free end of said projection intersecting with the first mentioned bore and having its center line aligned with said extremity and disposed normal to said reference plane.

3. The plumb line support body of claim 1 wherein said window means includes a pair of windows formed therethrough including one pair of corresponding ends opening into said recess and the other pair of corresponding ends opening outwardly of said one side of said body, said other pair of corresponding ends disposed on opposite sides of said projection.

4. The plumb line support body of claim 1 wherein said one side of said body defines a groove extending thereacross into which to receive a plumb line, said groove including a midportion with which said outer extremity is registered.

5. The plumb line support body of claim 1 wherein said body is constructed of magnetic material.

6. The plumb line support body of claim 1 wherein said line anchoring means includes a transverse bore formed through said projection and a second bore formed in the free end of said projection intersecting with the first mentioned bore and having its center line aligned with said extremity and disposed normal to said reference plane, said window means including a pair of windows formed therethrough including one pair of corresponding ends opening into said recess and the other pair of corresponding ends opening outwardly of said one side of said body, said other pair of corresponding ends being disposed on opposite sides of said projection, said one side of said body defining a groove extending thereacross into which to receive a plumb line, said groove including a midportion with which said outer extremity is registered.

7. The plumb line support body of claim 6 wherein said one side of said body defines a groove extending thereacross into which to receive a plumb line, said groove including a midportion with which said outer extremity is registered.

* * * * *